US010993171B2

(12) United States Patent
Patil et al.

(10) Patent No.: US 10,993,171 B2
(45) Date of Patent: Apr. 27, 2021

(54) ADVERTISEMENT OF COMMUNICATION SCHEDULES FOR MULTIPLE BASIC SERVICE SETS

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 16/235,703

(22) Filed: Dec. 28, 2018

(65) Prior Publication Data

US 2019/0208462 A1 Jul. 4, 2019

Related U.S. Application Data

(60) Provisional application No. 62/612,876, filed on Jan. 2, 2018.

(51) Int. Cl.
| | |
|---|---|
| *H04W 48/10* | (2009.01) |
| *H04W 72/12* | (2009.01) |
| *H04W 8/26* | (2009.01) |
| *H04W 52/02* | (2009.01) |
| *H04W 76/11* | (2018.01) |

(52) U.S. Cl.
CPC ............ *H04W 48/10* (2013.01); *H04W 8/26* (2013.01); *H04W 52/0216* (2013.01); *H04W 72/1289* (2013.01); *H04W 76/11* (2018.02)

(58) Field of Classification Search
None
See application file for complete search history.

(56) References Cited

U.S. PATENT DOCUMENTS

| 10,237,891 B1* | 3/2019 | Chu .................... H04W 74/002 |
| 2006/0165103 A1 | 7/2006 | Trudeau et al. |
| 2008/0049621 A1 | 2/2008 | McGuire et al. |
| 2008/0298333 A1* | 12/2008 | Seok .................... H04W 8/005 |
| | | 370/338 |
| 2020/0053733 A1* | 2/2020 | Li .................... H04W 72/0453 |

FOREIGN PATENT DOCUMENTS

| EP | 3182677 A1 | 6/2017 |
| WO | WO-2017201027 A2 | 11/2017 |

OTHER PUBLICATIONS

International Search Report and Written Opinion—PCT/US2018/068070—ISA/EPO—dated Mar. 28, 2019.

\* cited by examiner

*Primary Examiner* — Christine T Duong
(74) *Attorney, Agent, or Firm* — Patterson & Sheridan, LLP

(57) ABSTRACT

Certain aspects relate to methods, apparatuses, computer readable mediums, access points and stations. For example, the apparatus generally includes (1) a processing system configured to select a first address from a plurality of addresses associated with the apparatus, said plurality of addresses including the first address and one or more second addresses and generate a frame having (i) a header having the first address (ii) a first portion having one or more indications of the one or more second addresses and (iii) a second portion comprising first parameters for communication with the apparatus and (2) an interface configured to output the frame for transmission.

23 Claims, 11 Drawing Sheets

ADVERTISEMENT OF COMMUNICATION SCHEDULES FOR MULTIPLE BASIC SERVICE SETS

CLAIM OF PRIORITY UNDER 35 U.S.C. § 119

This application claims the benefit of U.S. Provisional Patent Application Ser. No. 62/612,876, filed Jan. 2, 2018, which is herein incorporated by reference in its entirety.

FIELD

The present disclosure generally relates to communications networks, and more particularly, to methods and apparatuses relating to advertisement of communication schedules for multiple basic service sets (hereinafter "BSSs").

BACKGROUND

Wireless communication networks are widely deployed to provide various communication services such as telephony, video, data, messaging, broadcasts, and so on. Such networks, which are usually multiple access networks, support communications for multiple users by sharing the available network resources.

These wireless communication networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks and Wi-Fi networks.

Within such wireless communication networks, a variety of data services may be provided, including voice, video, and emails. More recently, wireless communication networks are being used for an even broader range of services and larger numbers of users. As the demand for mobile broadband access continues to increase, research and development continue to advance wireless communication technologies not only to meet the growing demand for mobile broadband access, but to advance and enhance the user experience.

BRIEF SUMMARY

The systems, networks, methods, devices and apparatuses of the disclosure each have several aspects. No single one of the aspects is solely responsible for desirable attributes of such systems, networks, methods, devices and apparatuses. Without limiting the scope of this disclosure as expressed by the claims which follow, some aspects will now be discussed briefly. After considering this discussion, and particularly after reading the section entitled "Detailed Description" one will understand how the aspects of this disclosure provide advantages that include improved communications between wireless nodes in a wireless network.

Certain aspects provide an apparatus for wireless communication. The apparatus generally includes (1) a processing system configured to select a first address from a plurality of addresses associated with the apparatus, said plurality of addresses including the first address and one or more second addresses and generate a frame having (i) a header having the first address (ii) a first portion having one or more indications of the one or more second addresses and (iii) a second portion comprising first parameters for communication with the apparatus and (2) an interface configured to output the frame for transmission.

Certain aspects provide an apparatus for wireless communication. The apparatus generally includes (1) an interface configured to obtain a frame from a wireless node, said frame having (i) a header comprising a first address, (ii) a first portion having one or more indications of one or more second addresses and (iii) a second portion comprising first parameters for communication with the wireless node and (2) a processing system configured to (i) determine whether the apparatus is associated with the first address or one of the one or more second addresses and (ii) if the determination indicates the apparatus is associated with the first address, communicate with the wireless node based on the first parameters.

Aspects generally include methods, apparatuses, computer readable mediums, access points and stations, as substantially described herein with reference to and as illustrated by the accompanying drawings. Numerous other aspects are provided.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially used on other aspects without specific recitation.

DETAILED DESCRIPTION

Figure 1:
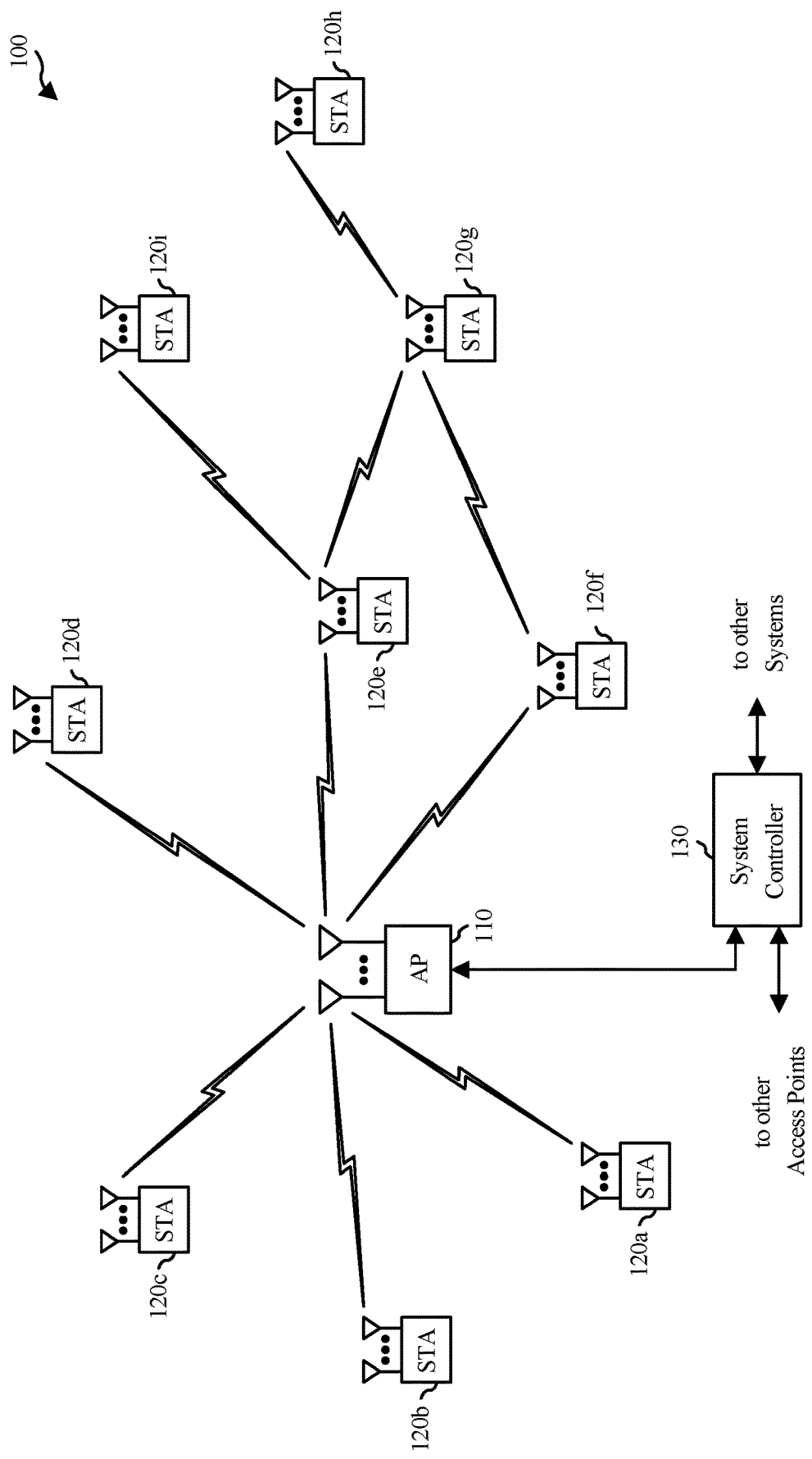
FIG. 1 is a diagram of a sample wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The word "communicate" is used herein to mean "transmit", "receive" or "transmit and receive". The word "communications" is used herein to mean "transmission", "reception" or "transmission and reception".

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in different ways and may be incorporated into various types of communication networks or network components. In some aspects, the teachings herein may be employed in a multiple-access network capable of supporting communication with multiple users by sharing the available network resources (e.g., by specifying one or more of bandwidth, transmit power, coding, interleaving, and so on). For example, the teachings herein may be applied to any one or combinations of the following technologies or standards: Code Division Multiple Access (CDMA), Multiple-Carrier CDMA (MCCDMA), Wideband CDMA (W-CDMA), Time Division Multiple Access (TDMA), Frequency Division Multiple Access (FDMA), Single-Carrier FDMA (SC-FDMA), Orthogonal Frequency Division Multiple Access (OFDMA), IS-95, cdma2000, IS-856, W-CDMA, TDSCDMA, 802.11 (Wi-Fi), 802.16, Global System for Mobile Communication (GSM), Evolved UTRA (E-UTRA), IEEE 802.20, Flash-OFDM®, Long Term Evolution (LTE), Ultra-Mobile Broadband (UMB), Ultra-Wide Band (UWB), Bluetooth®, GSM/General Packet Radio Service (GPRS), Enhanced Data GSM Environment (EDGE), Terrestrial Trunked Radio (TETRA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), AMPS, or other technology of 3G, 4G, or 5G.

The techniques may be incorporated into (such as implemented within or performed by) a variety of wired or wireless apparatuses (such as nodes or devices). In some implementations, a node includes a wireless node. Such a wireless node may provide, for example, connectivity to or for a network [such as a wide area network (WAN) such as the Internet or a cellular network] via a wired or wireless communications link. In some implementations, a wireless node may be an access point or a user terminal.

Example of Wireless Communications Network

FIG. 1 illustrates a multiple-access Multiple Input Multiple Output (MIMO) network 100 with access points and user terminals, in which aspects of the present disclosure may be practiced. For example, clients (e.g., STAs 120) may be configured to process advertisement of communication schedules for multiple basic service set IDs (BSSIDs) according to techniques described herein.

For simplicity, only one access point 110 is shown in FIG. 1. An access point (AP) is generally a fixed station that communicates with the user terminals and also may be referred to as a base station or some other terminology. A user terminal may be fixed or mobile and also may be referred to as a mobile station, an access terminal, a station (STA), a client, user equipment or some other terminology. A user terminal may be a cellular phone, a personal digital assistant (PDA), a handheld device, a wireless modem, a laptop computer, a personal computer, etc.

The access point 110 may communicate with one or more user terminals or stations 120 at any given moment on the downlink and uplink. The downlink (i.e., forward link) is the communications link from the access point to the user terminals, and the uplink (i.e., reverse link) is the communications link from the user terminals to the access point. A user terminal also may communicate peer-to-peer with another user terminal. A network controller 130 couples to and provides coordination and control for the access points.

The MIMO network 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system or network 100 may be a time division duplex (TDD) network or a frequency division duplex (FDD) network. For a TDD network, the downlink and uplink share the same frequency band. For an FDD network, the downlink and uplink use different frequency bands. The MIMO network 100 also may use a single carrier or multiple carriers for transmission. Each user terminal may be equipped with a single antenna (such as in order to keep costs down) or multiple antennas (such as where the additional cost can be supported). The MIMO network 100 may represent a high speed Wireless Local Area Network (WLAN) operating in a 60 GHz band.

Figure 2:
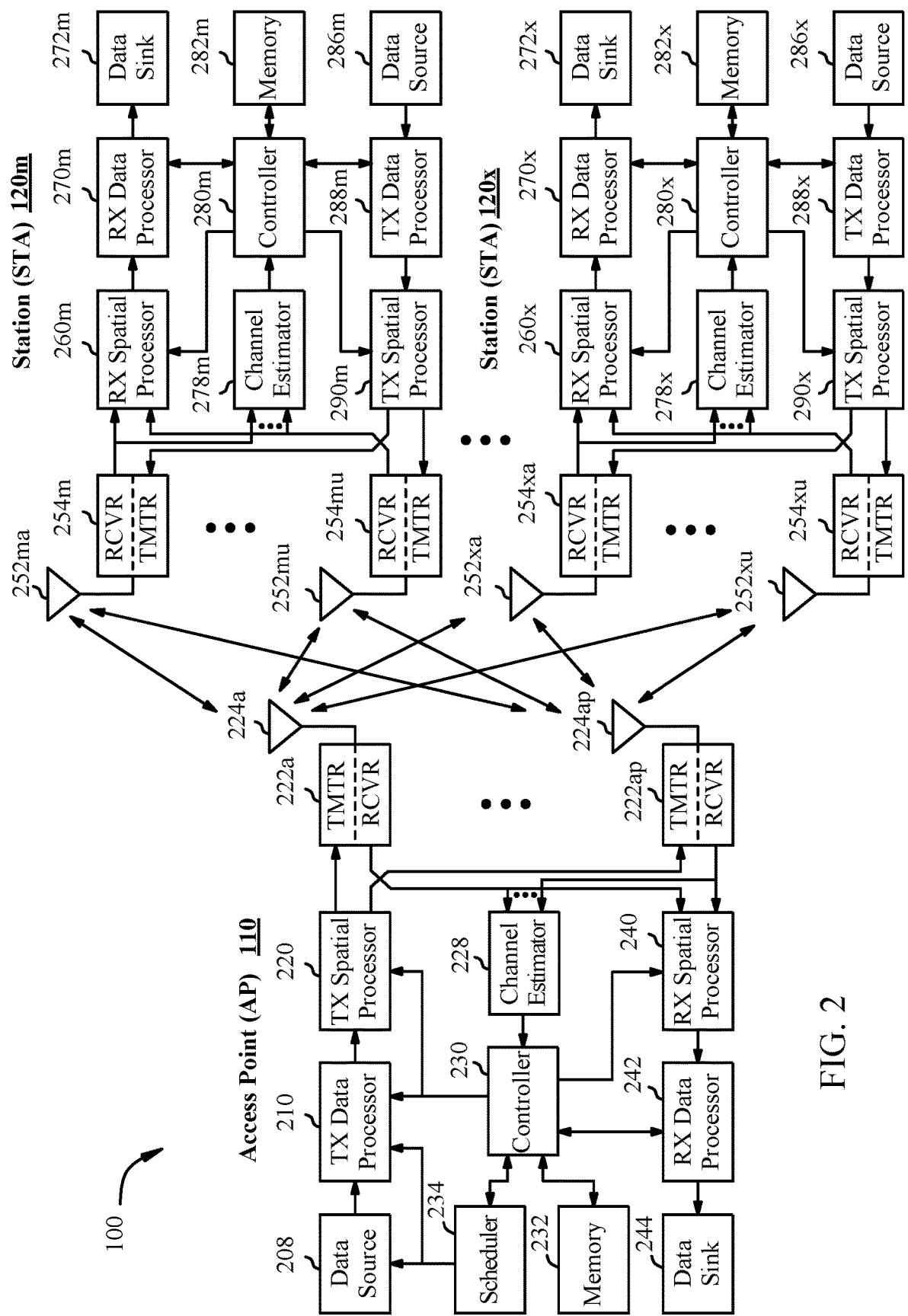
FIG. 2 is a block diagram of a sample access point and sample stations, in accordance with certain aspects of the present disclosure.

FIG. 2 illustrates example components of the access point 110 and user terminal or station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 6, 6A, 7, and 7A.

FIG. 2 shows a block diagram of the access point/base station 110 and two user terminals 120m and 120x in a MIMO network 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$, and $N_{dn}$ may include static values or can change for each scheduling interval. Beamforming (such as beam-steering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{s_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
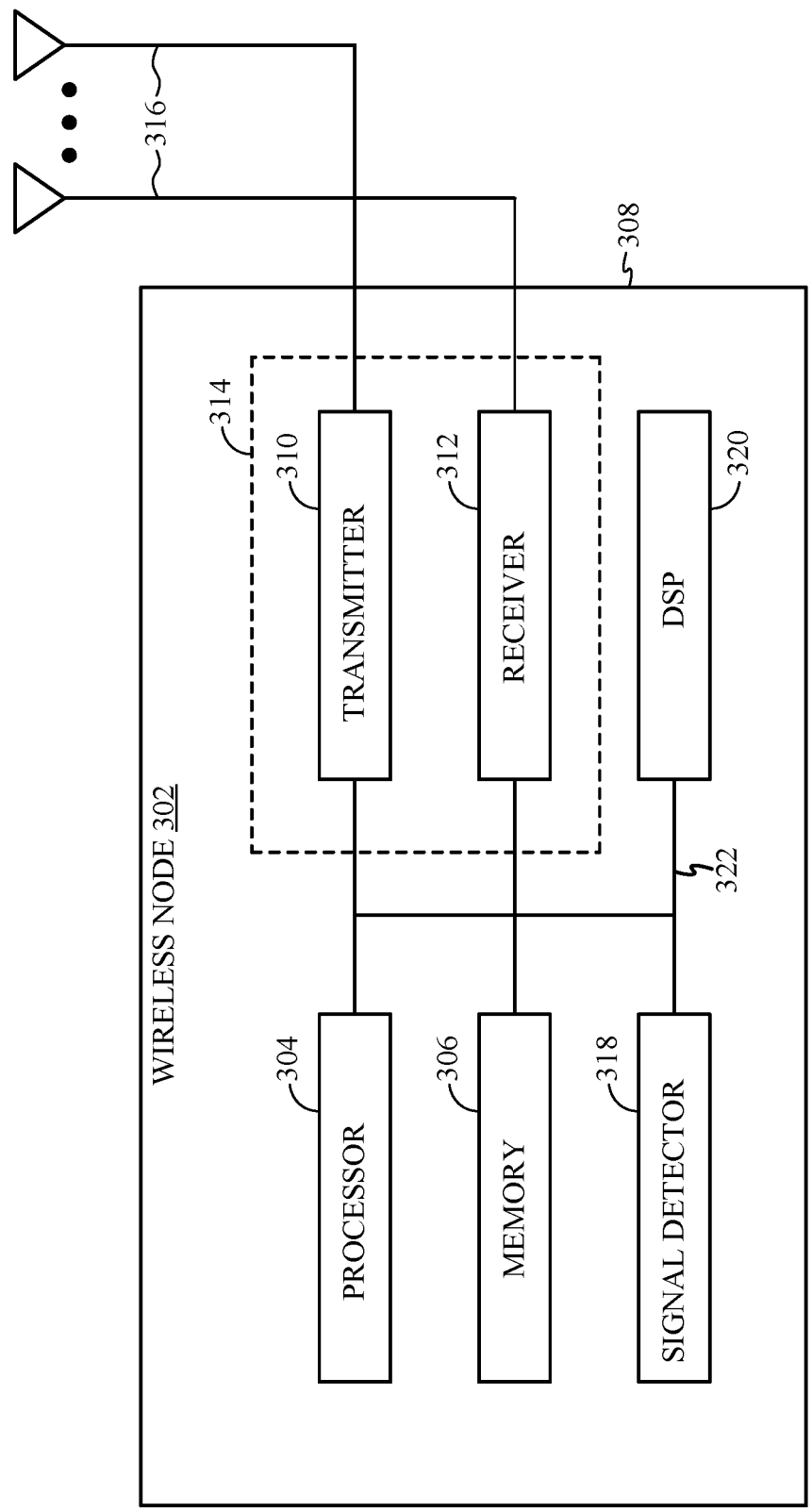
FIG. 3 illustrates a sample wireless node, in accordance with certain aspects of the present disclosure.

FIG. 3 illustrates various components that may be used in a wireless node 302 that may be employed within the MIMO network 100. The wireless node 302 is an example of a device that may be configured to implement the various methods described herein. The wireless node 302 may be an access point 110 or a user terminal 120.

The wireless node 302 may include a processor 304 which controls operation of the wireless node 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless node 302 also may include a housing 308 that may include a transmitter 310 and a receiver 312 to allow transmission and reception of data between the wireless node 302 and a remote location. The transmitter 310 and the receiver 312 may be combined into a transceiver 314. A plurality of transmit antennas 316 may be attached to the housing 308 and electrically coupled to the transceiver 314. The wireless node 302 also may include (not shown) multiple transmitters, multiple receivers, and multiple transceivers.

The wireless node 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless node 302 also may include a digital signal processor (DSP) 320 for use in processing signals.

The various components of the wireless node 302 may be coupled together by a bus system 322, which may include a power bus, a control signal bus, and a status signal bus in addition to a data bus.

Figure 4:
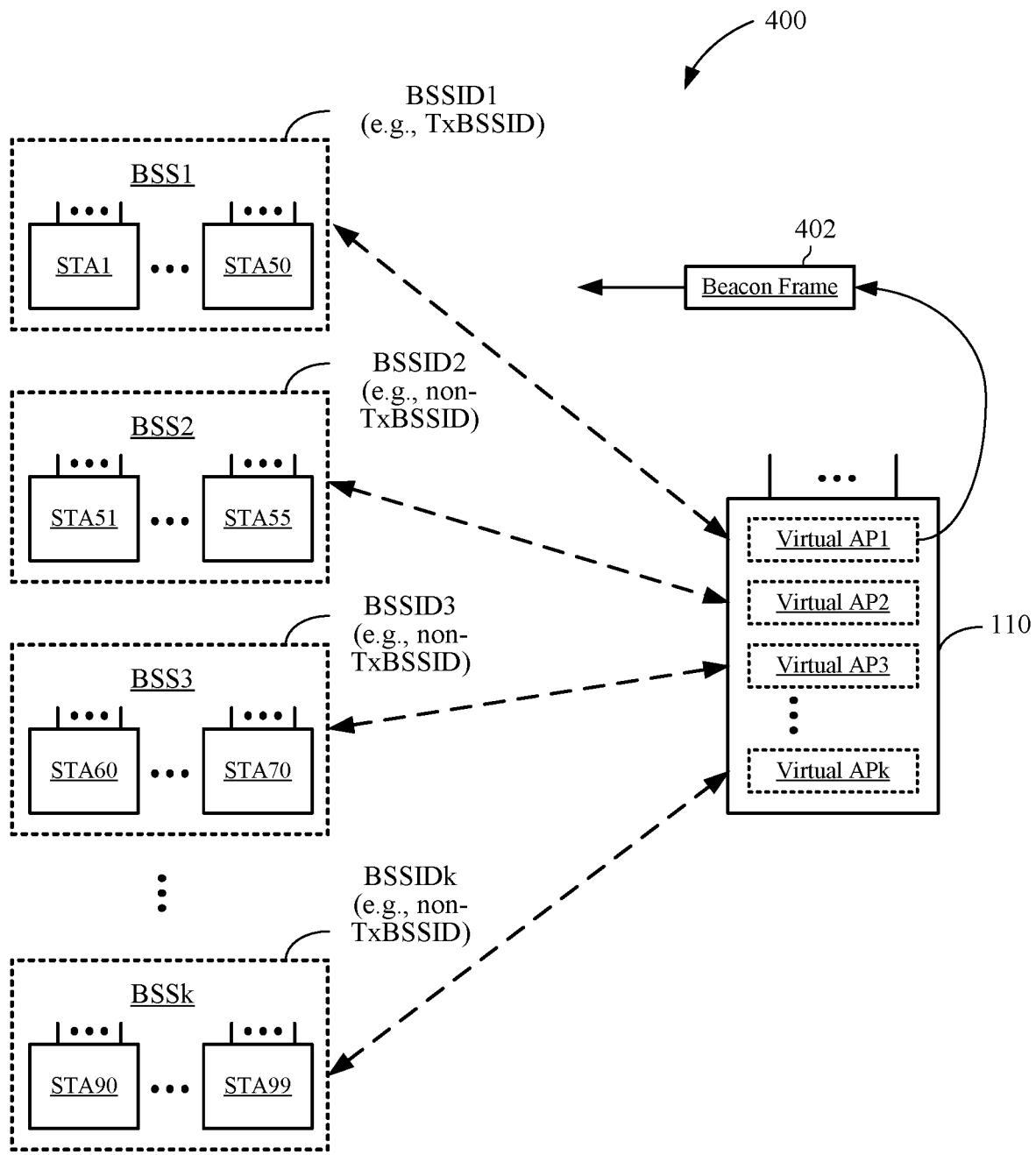
FIG. 4 illustrates a block diagram of another wireless communications network within which certain aspects of the present disclosure can be implemented.

FIG. 4 is a block diagram of another network 400 within which aspects of the present disclosure may be implemented. The network 400 is similar to the network 100 of FIG. 1, except that the AP 110 of FIG. 4 is depicted as independently operating a plurality of basic service sets BSS1-BSSk. For the example of FIG. 4, the first basic service set BSS1 is shown to include a first set of wireless stations STA1-STA50, the second basic service set BSS2 is shown to include a second set of wireless stations STA51-STA55, the third basic service set BSS3 is shown to include a third set of wireless stations STA60-STA70, and so on, where the $k^{th}$ basic service set BSSk is shown to include a $k^{th}$ set of wireless stations STA90-STA99. In other example implementations, each of the basic service sets BSS1-BSSk may include other suitable numbers of wireless stations.

Each of the basic service sets BSS1-BSSk may be assigned a different basic service set identifier (BSSID) or MAC address, for example, so that the AP 110 and each of the sets of wireless stations STAs can distinguish between data transmissions corresponding to each of the different basic service sets BSS1-BSSk. In some implementations, each of the BSSIDs assigned to the basic service sets BSS1-BSSk may be a unique identifier such as a unique 48-bit identifier to identify the respective BSS. In some aspects, the BSSIDs may be used as a filtering address, for example, so that only the wireless stations STAs associated with a given BSS may receive and decode frames or packets intended for reception by wireless nodes or wireless devices belonging to or associated with the given BSS. For purposes of discussion herein, the first basic service set BSS1 may be assigned a first ID denoted herein as "BSSID=1," the second basic service set BSS2 may be assigned a second ID denoted herein as "BSSID=2," the third basic service set BSS3 may be assigned a third ID denoted herein as "BSSID=3," and so on, where the $k^{th}$ basic service set BSSk may be assigned a $k^{th}$ ID denoted herein as "BSSID=k."

The AP 110 may announce the existence of the basic service sets BSS1-BSSk in a single management frame (such as rather than announcing each of the basic service sets BSS1-BSSk in separate management frames). More specifically, the AP 110 may announce the existence of the basic service sets BSS1-BSSk in one or more: beacon frames, probe response frames, association frames, re-association frames or any other suitable management frames. In some implementations, a beacon frame 402 may include a Multiple BSSID element to announce a multiple BSSID capability of the AP 110 and the existence of multiple basic service sets (BSSs) operated or controlled by the AP 110. The multiple BSSID capability may refer to the capability to advertise information for multiple basic service set identifiers (BSSIDs) using a single beacon frame or a single probe response frame (rather than using multiple beacon frames or multiple probe response frames), and also may refer to the capability to indicate buffered frames for STAs belonging to different BSSIDs using a single traffic indication map (TIM) element in a single beacon frame.

As depicted in the example of FIG. 4, the AP 110 may operate the multiple basic service sets BSS1-BSSk using a corresponding number of virtual access points VAP1-VAPk. Each of the virtual access points VAP1-VAPk may manage a corresponding one of the basic service sets BSS1-BSSk, respectively, and may operate in a manner similar to a stand-alone access point. Thus, although the virtual access points VAP1-VAPk each may use (or be assigned) a different transmitter address (TAs) when transmitting frames and use (or be assigned) a different receiver address (RA) when receiving frames, the virtual access points VAP1-VAPk may be physically contained or integrated within a single access point device. In this manner, the various stations associated with the AP 110 can distinguish between the different virtual access points VAP1-VAPk and between the different basic service sets BSS1-BSSk, for example, when transmitting and receiving data. In addition, a new STA (not yet associated with any AP) can identify the various basic service sets BSS1-BSSk and determine with which of the virtual access points VAP1-VAPk to associate. As mentioned above, each of the different virtual access points VAP1-VAPk may be assigned a different BSSID or MAC address so that wireless nodes such as stations can distinguish between the various basic service sets BSS1-BSSk. In some implementations, the BSSID values assigned to the different virtual access points VAP1-VAPk may share a number of most significant bits (MSBs) and differ only in a few least significant bits (LSBs). For example, in a multiple BSSID work including 8 different basic service sets BSS1-BSS8, the BSSID values may differ from each other only in the 3 LSBs (such as because $2^3$=8).

The Multiple BSSID element also may allow the AP 110 to indicate that it has queued data for STAs belonging to different BSSs using a single traffic indication map (TIM) element provided in the beacon frame 402. In this manner, the AP 110 may indicate the presence of queued data to any of the STAs in the wireless network 400, regardless of which of the basic service sets BSS1-BSSk any particular STA is associated with.

As used herein, an AP that transmits a management frame such as the beacon frame 402 containing the Multiple BSSID element may be referred to as the transmitting or transmitted BSSID (hereinafter "TxBSSID") because the beacon frame 402 actually includes a TxBSSID therein, and other APs that do not transmit beacon frames may be referred to as non-transmitting or non-transmitted BSSIDs. For the example of FIG. 4, the VAP1 transmits the beacon frame 402 containing the Multiple BSSID element, and therefore may be referred to as the TxBSSID; the virtual access points VAP2-VAPk do not transmit beacon frames, and therefore may be referred to as the non-transmitted BSSIDs (hereinafter "non-TxBSSIDs"). More specifically, beacon frames transmitted by the VAP1 may include a Partial Virtual Bitmap field that indicates the presence or absence of queued data to be delivered to all STAs irrespective of whether the STAs are associated with the TxBSSID or associated with one of the non-transmitted BSSIDs.

Task Group 802.11ax requires a client device such as a station, which can be a non-AP station (hereinafter "STA"), to support multiple BSS features as described above with respect to FIG. 4. When an AP such as the 110 is configured to host multiple VAPs, such AP needs to inform the STAB of its capabilities including schedules such as TWT service periods for communication associated with multiple VAPs so that each STA can timely select a schedule for communication with the associated VAP.

The following examples of apparatuses, methods, computer readable mediums and wireless nodes efficiently advertise communication schedules for multiple BSSs and timely select one of such schedules for communication.

Example of Advertising Communication Schedules for Multiple BSSs

Figure 5:
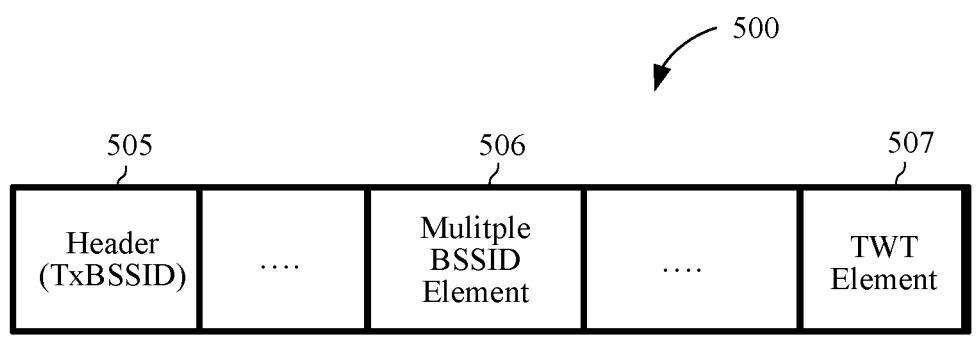
FIG. 5 illustrates an example of a frame for advertising communication schedules for multiple BSSs, in accordance with certain aspects of the present disclosure.

FIG. 5 illustrates a sample format of a frame 500 that can be used to advertise at least one communication schedule for multiple BSSs according to certain aspects of the present disclosure. Each schedules may indicate when to transmit to and/or receive from devices in a corresponding BSS. The frame 500 can be a management frame, that in, turn can be a beacon frame such as the beacon frame 402 of FIG. 4, a probe response frame, an association frame or a re-association frame. The frame 500 has one or more fields having a fixed length and one or more elements. An element has at least one field and can also include another element therein and if so, the element being included can be referred to as a sub-element. More specifically, one of the fields of the frame 500 is a header 505 and two of the elements of the frame 500 are Multiple BSSID element 506 and target wake time (TWT) element 507. The Multiple BSSID 506 element, the TWT element 507 or both of them can include parameters indicating capabilities and communication schedules for multiple BSSs as further explained below.

Regarding the header 505 of the frame 500, it includes an indication of BSSID or an actual BSSID associated with the transmitter of the frame 500, which is VAP1 of BSS1. Thus, the header 505 effectively includes BSSID1, which is TxBSSID, so that STAs of all the BSS1-BSSk know how to process the frame 500. The frame 500 can also include one or more indications of non-TxBSSIDs such as BSSID2-BSSIDk so that STAs of a particular BSS can determine the presence of its associated non-TxBSSID by processing the frame 500. The indications of non-TxBSSIDs can either (1) include information from which each STA can determine the non-TxBSSIDs or (2) be the actual non-TxBSSIDs. Such indications are provided in the non-Tx BSSID profile 505 as further explained below with respect to FIG. 5A.

Figure 5A:
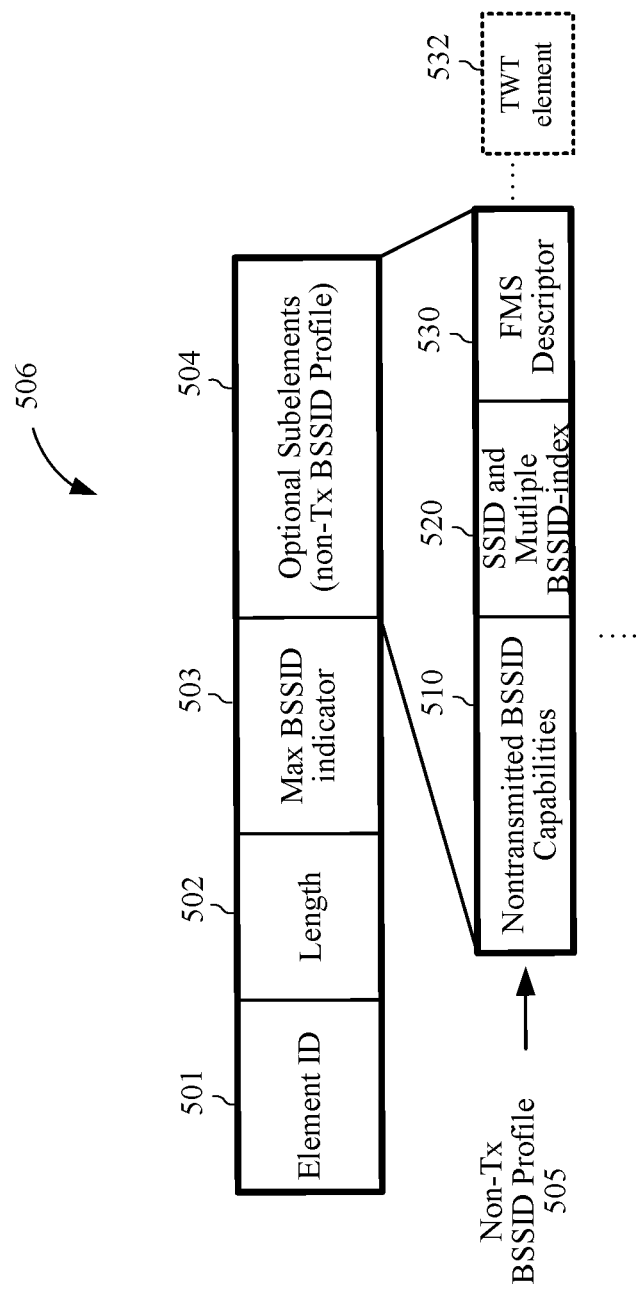
FIG. 5A illustrates a sample Multiple Basic Service Set Identifier (BSSID) element included in the frame of FIG. 5, in accordance with certain aspects of the present disclosure.

FIG. 5A illustrates more details about the Multiple BSSID element 506 in the frame 500 of FIG. 5. The Multiple BSSID element 506, which may be used by the VAP1 to indicate that the VAP1 belongs to a Multiple BSSID set (such as the set including the basic service sets BSS1-BSSk of FIG. 4) hosted by the AP 110, is shown to include an Element ID field 501, a Length field 502, a MaxBSSID Indicator field 503, and an Optional Subelements field 504. The Element ID field 501 may store a value indicating the element type (such as a Multiple BSSID element). The Length field 502 may store a value indicating a length of the Multiple BSSID element 506. The MaxBSSID Indicator field 503 may store a value indicating the maximum possible number of BSSIDs in a particular multiple BSSID set. In some aspects, the actual number of BSSIDs in the multiple BSSID set may not be explicitly signaled. The MaxBSSID Indicator field 503 may store a value of "n" to indicate a maximum number $2^n$ of BSSIDs supported by the AP 110. In some aspects, the frame 500 may include more than one multiple BSSID element 506.

The Optional Subelements field 504 may store zero or more additional subelements. For the example of FIG. 5A, the Optional Subelements field 504 is shown to include at least one non-TxBSSID profile 505 and each non-TxBSSID profile is respectively associated with one of the non-TxBSSIDs such as BSSIDs 2-$k$ of VAP2-VAPk as illustrated in FIG. 4. In some aspects, the non-TxBSSID profile 505 is indicated by or includes a Nontransmitted BSSID Capabilities element 510, an SSID and Mulitple BSSID-index element 520, and a FMS descriptor element 530. In certain aspects, the non-TxBSSID profile 505 does not include the FMS descriptor element 530.

In other aspects, the non-Tx BSSID profile 505 can further include a TWT element 532 having parameters therein to indicate at least one communication schedule associated with a particular one of the non-TxBSSIDs. For example, the parameters can indicate (1) a schedule regarding when STAs of BSS3 can transmit information or data to VAP3, (2) a schedule regarding when the STAs of BSS3 can receive information or data from the VAP3 so that the STAs of BSS3 can save power by sleeping or operating a low power mode before waking up to receive information or data from VAP3 in accordance with the schedule or (3) both of schedule to transmit and schedule to receive. Associated with such transmission or reception, the parameters further indicate a type of frame, a type of data, a size of data, a size of frame, a mode of operation, category of devices, devices of a particular type, devices having a particular capability or any combination thereof.

For certain aspects, there are multiple non-TxBSSID profiles 505 and either (a) each profile 505 has a TWT element 532 or (b) one or more of the profiles 505 do not have a TWT element 532. With respect to the example (a), the Optional Subelements field 504 can have two non-TxBSSID profiles 505 being respectively associated with BSS2-BSS3. The first profile 505 being associated with BSS2 includes a TWT element 532 with parameters for STAs of BSS2 to communicate with VAP2. Similarly, the second profile 505 being associated with BSS3 includes a TWT element 532 with parameters for STAs of BSS3 to communicate with VAP3. with respect to the example (b), the first profile 505 being associated with BSS2 includes a TWT element 532 with parameters for STAs of BSS2 to communicate with VAP2 but the second profile 505 being associated with BSS3 does not have a TWT element 532, i.e., does not have any BSS specific parameters for STAs of BSS3 to communicate with VAP3. For this aspect, the STAs of BSS3 can use or inherit the parameters included in the TWT element 507 being advertised in the frame 500 transmitted by VAP1 or the TxBSSID to communicate with the VAP3 as further explained below. As will be described in greater detail below, a non-TxBSSID VAP may allow its STAs to inherit parameters included in a TWT element (e.g., by not advertising anything) or may advertise its own TWT parameter set (in the non-TxBSSID parameter set). In some cases (e.g., if a VAP does not want to support TWT at all), a VAP may indicate a TWT element as one that it does not want to inherit from the TxBSSID. In other words, options for a VAP include indicating a desire to inherit TWT parameters, a desire to use the VAP's own TWT parameters, or an explicit indication to not inherit.

Regarding the TWT element 507 of the frame 500, it includes parameters for at least STAs of BSS1 to communicate with VAP1. The parameters included in TWT element 507 are associated with the TxBSSID being identified in the header of the frame 500 but they can also be used by STAs associated with non-TxBSSIDs for which there are no communication parameters being indicated in their respective non-TxBSSID profiles 505. For example, as discussed in the previous paragraph, STAs of BSS3 can use the parameters being included in TWT element 507 to communicate with VAP3 since AP 110 has determined that BSS1 and BSS3 should use the same one or more schedules for communication with the respective VAP1 and VAP3. Thus, there is no need for the non-TxBSSID profile 505 associated with BSS3 to have a TWT element 532 with parameters therein to indicate the same one or more schedules being indicated by the parameters of the TWT element 507. For this aspect, the frame 500 can also include one or more indications regarding the parameters of TWT element 507 are associated with both TxBSSID (BSSID1) and non-TxBSSID (BSSID3) or with BSS1 and BSS3 so that it would be more obvious for the STAs of BSS3 to know that they should use these parameters. Such indications can be included in the TWT element 507, another portion of the frame, another field of the TWT element 507, another field of the frame 500 or another element of the frame 500. In certain aspects, the TWT element 507 has a field including an indication that all of the schedules indicated by the parameters in the TWT element 507 are associated with (1) the TxBSSID and all of the non-TxBSSIDs of the multiple BSSs or (2) the TxBSSID and any of the non-TxBSSIDs for which a respective TWT element 532 is not present as further explained below. In other aspects, the frame 500 or the TWT element 507 has an indication associating each subset of the parameters to a particular non-TxBSSID.

Alternatively, the STAs of BSS3 can determine whether the non-TxBSSID profile 505 associated with its non-TxBSSID (BSSID3) has a TWT element 532 therein and if not, the STAs of BSS3 would then know that they should use the parameters in the TWT element 507 to communicate with VAP3. If the TWT element 532 is present, the STAs of BSS3 would just use the parameters of TWT element 532 being associated with BSSID3, which is a non-TxBSSID.

Figure 6:
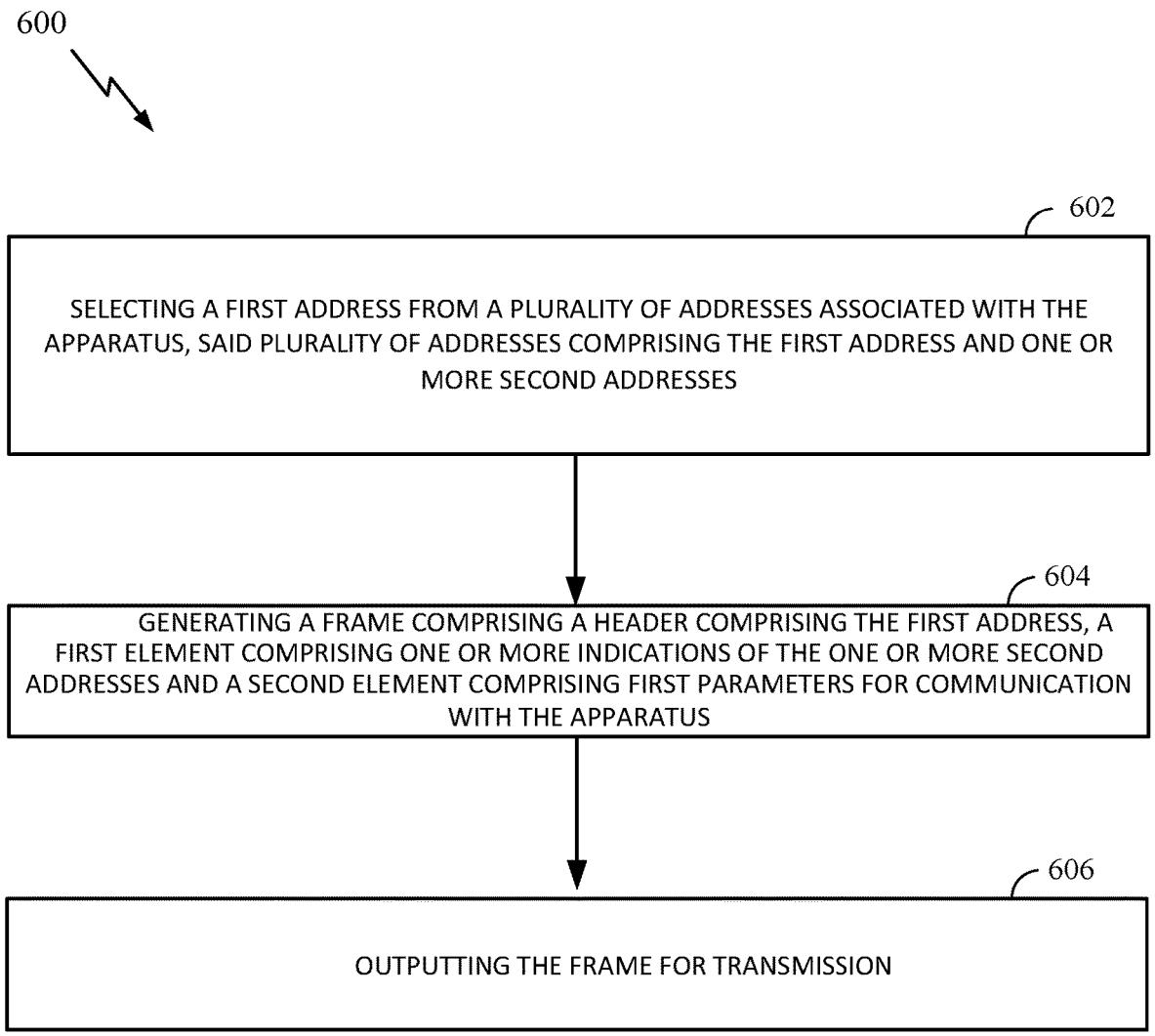
FIG. 6 is a flow diagram of sample operations for wireless communications, in accordance with certain aspects of the present disclosure directed to advertisement of communication schedules for multiple basic service sets.
Figure 6A:
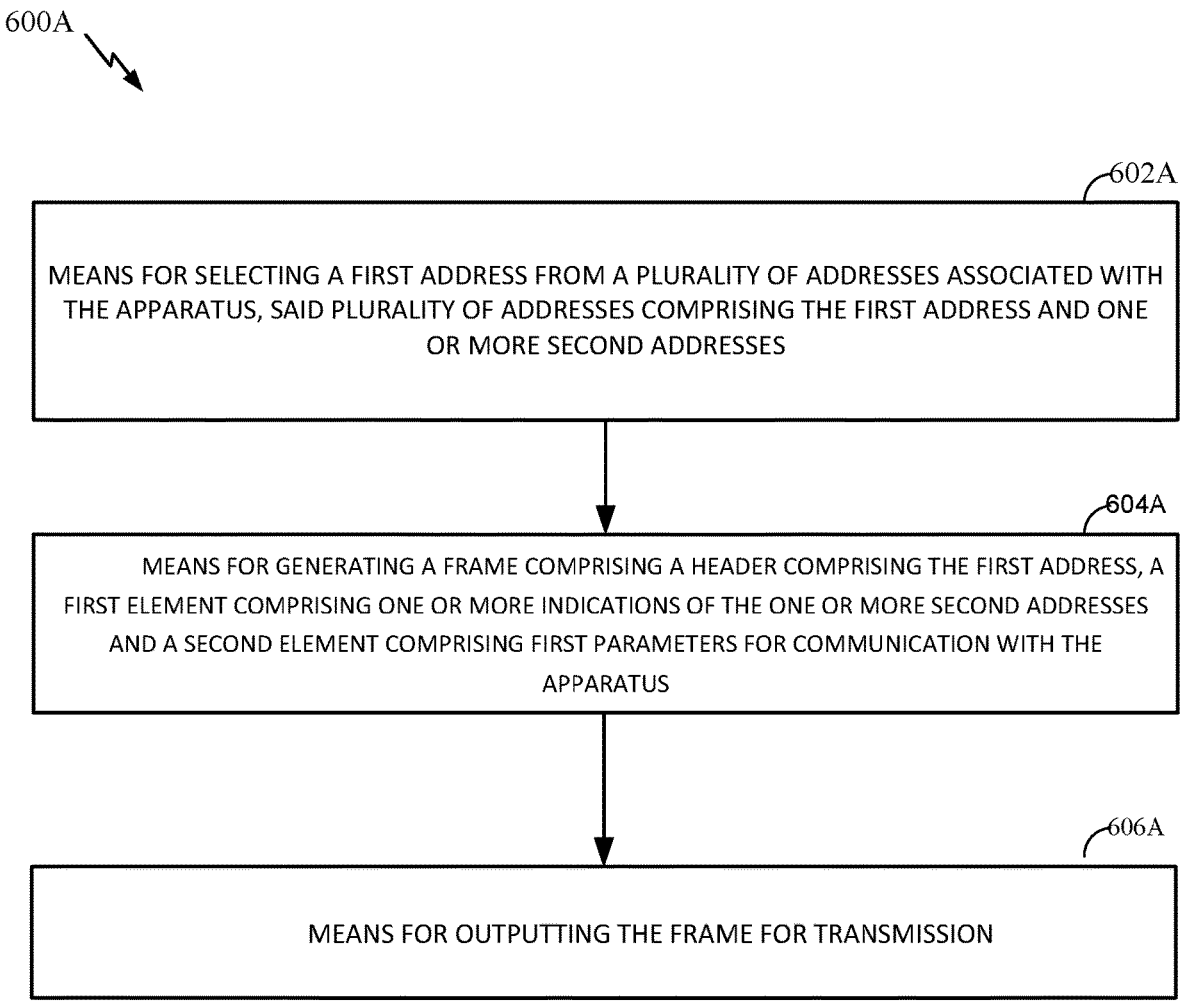
FIG. 6A illustrates sample components capable of performing the operations shown in FIG. 6, in accordance with certain aspects of the present disclosure.

FIG. 6 is a flow diagram of sample operations for wireless communications, in accordance with certain aspects of the present disclosure directed to advertisement of communication schedules for multiple BSSs. The operations 600 may be performed by an apparatus or a wireless node 302 of FIG. 3 such as AP 110 of FIG. 4.

At block 602, the apparatus selects a first address from a plurality of addresses associated with the apparatus. These addresses can be BSSIDs such as BSSID1-BSSIDk or MAC addresses and the selected first address such as BSSID1 would be the TxBSSID.

At block 604, the apparatus generates a frame such as the frame 500 of FIG. 5. The generated frame includes (1) a header including the first address therein, (2) a first portion including one or more indications of the one or more second addresses and (3) a second portion including first parameters for communication with the apparatus. More specifically, the header can be the header 505 of FIG. 5 including the first address such as BSSID1 of FIG. 4, which is the TxBSSID. The first portion can be the Multiple BSSID element 506 and the second addresses are BSSID2-BSSIDk of FIG. 4, which are non-TxBSSIDs. The second portion can be the TWT element 507 and the first parameters therein can be used by STAs associated with at least the first address (BSSID1) to communicate with the apparatus.

In certain aspects, the first portion has only one indication of only one second address such as BSSID2. The apparatus would determine a first communication schedule for the first address (BSSID1) and a second communication schedule for the second address (BSSID2), the apparatus would then compare the determined schedules, and if the comparison indicates they are the same, the first parameters in the second portion would indicate one schedule (first or second schedule) to be used by STAs associated with BSSID1 and BSSID2 for communication with the apparatus.

Alternatively, the apparatus does not perform such determination and comparison and, regardless of whether the first and second communication schedules are the same, the first parameters in the second portion (TWT element 507) would indicate the first communication schedule and the first portion (Multiple BSSID element 505) would further include second parameters for indicating the second communication schedule. Such second parameters can be included in a TWT element 532 of the non-TxBSSID profile 505 FIG. 5A.

If the comparison indicates they are not the same, the first parameters in the second portion (TWT element 507) would indicate the first communication schedule and the first portion (Multiple BSSID element 505) would further include second parameters for indicating the second communication schedule. Such second parameters can be included in a TWT element 532 of the non-TxBSSID profile 505 FIG. 5A.

At block 606, the apparatus outputs the frame for transmission. In other words, the apparatus advertises at least one communication schedule for multiple BSSs via the generated frame such as the frame 500.

In certain aspects, the frame includes an indication for each BSS regarding which parameters should be used for communication or which of the at least one schedule indicated by the parameters should be used for communication. That way, each STA that receives the frame can quickly know which parameters or which schedule to use for communication with the apparatus.

Figure 7:
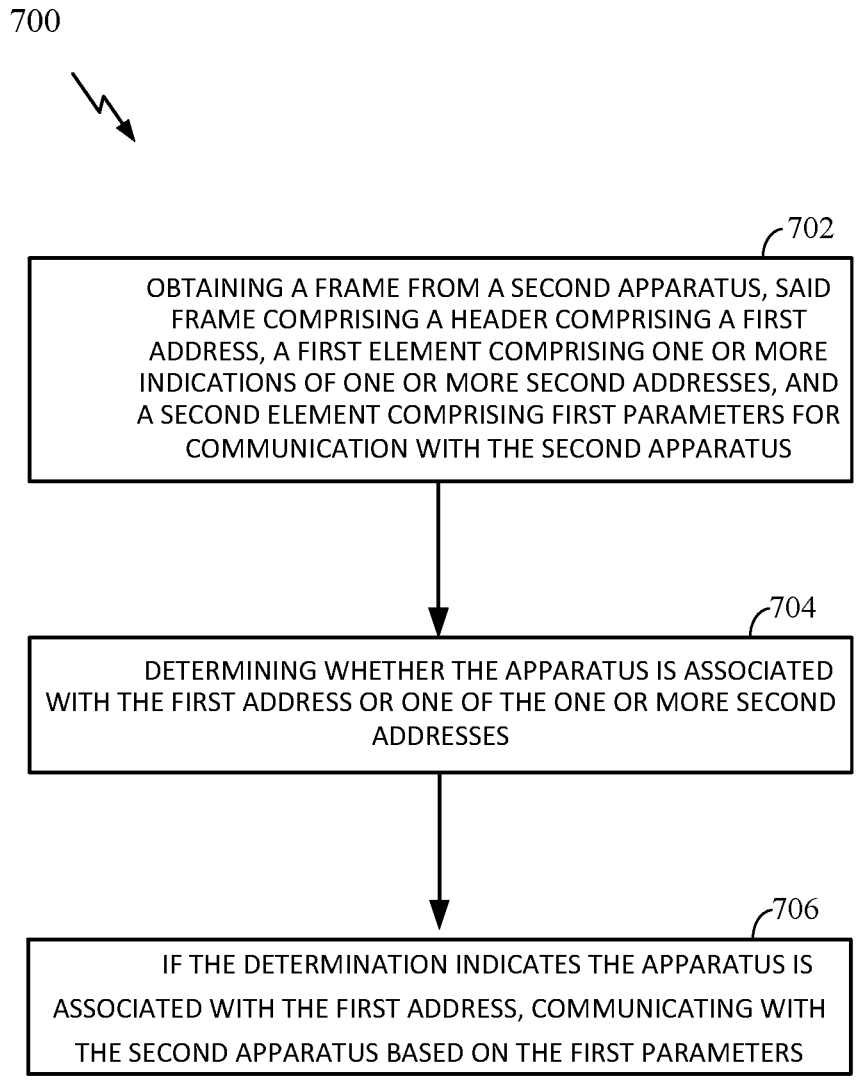
FIG. 7 is a flow diagram of sample operations for wireless communications, in accordance with certain aspects of the present disclosure directed to selection of a communication schedule from the advertisement associated with FIG. 6.
Figure 7A:
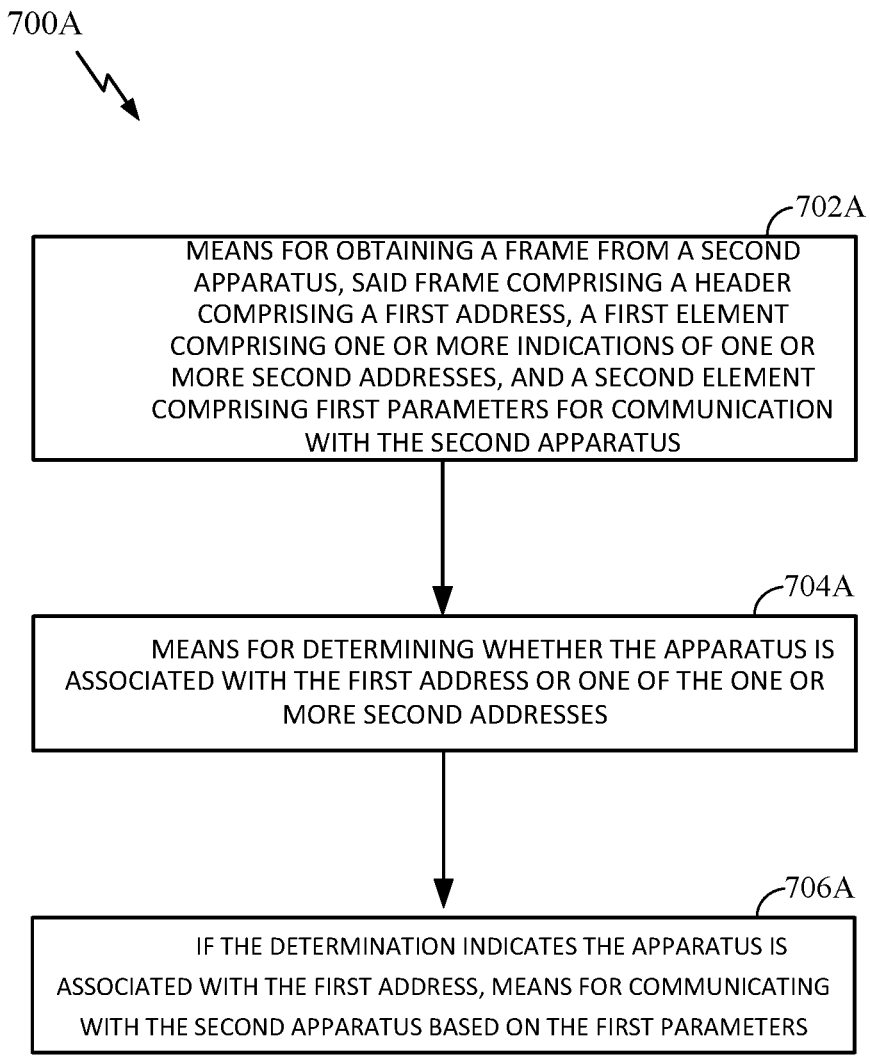
FIG. 7A illustrates sample components capable of performing the operations shown in FIG. 7, in accordance with certain aspects of the present disclosure.

Example of Selecting of a Communication Schedule from an Advertisement of Communication Schedules for Multiple BSSs FIG. 7 is a flow diagram of sample operations for wireless communications, in accordance with certain aspects of the present disclosure directed to selection of a communication schedule from the advertisement as described above with respect to FIG. 6. The operations 700 may be performed by an apparatus or a wireless node 302 of FIG. 3 such as STA.

At block 702, the apparatus obtains a frame such as the frame 500 of FIG. 5 from a wireless node such as the AP 110 of FIG. 4. The frame includes (1) a header having a first address, (2) a first portion having one or more indications of one or more second addresses and (3) a second portion having first parameters for communication with the wireless node. For example, the header can be the header 505 having BSSID1 as the first address therein, which is the TxBSSID. The first portion can be the Multiple BSSID element 506 and the second addresses can be BSSID2-BSSIDk, which are the non-TxBSSIDs. The second portion can be the TWT element 507.

At block 704, the apparatus then determines whether the apparatus is associated with the first address or one of the one or more second addresses. More specifically, the apparatus knows its address such as BSSID and compares its BSSID to the TxBSSID being included in the header and the one or more non-TxBSSIDs being identified in the first portion (Multiple BSSID element 506). If the BSSID of the apparatus is the same as BSSID1 (TxBSSID), the apparatus uses the first parameters for communication with the wireless node.

At block 706, if the determination indicates the apparatus is associated with the first address, communicate with the wireless node based on the first parameters.

In certain aspects, the first portion also includes, for each of the one or more second addresses (BSSID2-BSSIDk), second parameters for communication with the wireless node. Thus, if the determination indicates the apparatus is associated with one of the one or more second addresses, the apparatus communicates with the wireless node based on the second parameters for the particular second address being associated with the apparatus. In certain aspects, such second parameters are in the TWT element 532 associated with the respectively non-TxBSSID profile 505 of the Multiple BSSID element 506.

In other aspects, there are two second addresses, the first portion includes second parameters for communication with the wireless node and such second parameters are associated with a first one of the two second addresses. Here, if the determination indicates the apparatus is associated with the first one of the two second addresses, the apparatus communicates with the wireless node based on the second parameters being included in the TWT element 532. If the determination indicates the apparatus is not associated with the first one of the two second addresses, the apparatus communicates with the wireless node based on the first parameters being included in the TWT element 507.

As described herein, techniques are provided for VAPs to indicate what TWT parameters, if any, they desire to use. The indication may be explicit or implicit. For example, an AP for a TxBSSID may send a beacon that includes a TWT element for the TxBSSID. If a non-TxBSSID is not advertising its own TWT element in a non-TxBSSID profile, it may inherit the TWT parameter set from the TxBSSID. On the other hand, if the non TxBSSID so desires, it can advertise its own in the non TxBSSID parameter set. In some cases, a non TxBSSID may indicate a desire to not inherit TWT parameters from the TxBSSID (e.g., it may not even want to support TWT). In this case, it may include an element of TWT in an element used to indicate non-inherited parameters.

These various options may be summarized considering the following example of 4 VAPs: VAP1 is the TxBSSID, while VAP2, VAP3, and VAP4 are non TxBSSIDs. Assuming VAP2 wants to inherit the TWT parameters from the TxBSSID, it may not advertise anything. In contrast, VAP3 may want its own TWT parameters, so it may advertise its own TWT parameter set (in a non TxBSSID profile). Finally, VAP4 may not want to support TWT at all, so it may carry a non-inheritance element and list a TWT element as one that it does not want to inherit from the TxBSSID.

Various other information may be conveyed in beacons (e.g., BSSID or DMG beacons) for multiple BSSID procedures. For example, a Partial Virtual Bitmap field of a TIM element carried in a beacon frame may indicate the presence or absence of traffic to be delivered to all stations associated to a transmitted or nontransmitted BSSID. A subset of the bits of the bitmap may be reserved for an indication of group addressed frame for the Tx and non-Tx BSSIDs (e.g., a bit position 0 may indicate group addressed traffic for Tx BSSID, while a bit position matching a non-Tx BSSID's index may indicate group addressed traffic for that non-Tx BSSID). Each BSS of a BSS set may have a different Delivery Traffic Indication Message (DTIM) interval.

When more than one BSS in a multiple BSSID set has the same DTIM interval, broadcast TWTs may be used in an attempt to spread the transmission of group addressed frames within a beacon interval (e.g., to allow client devices to know when to check for group addressed frames, which may allow them to stay asleep longer). For example, an HE AP may use unannounced broadcast TWT SPs with Broadcast TWT ID equal to 0 and Broadcast TWT Recommendation set to 0 to spread the transmission of group addressed frames within the beacon interval that follows the DTIM Beacon frame. Each nonTx BSSID may advertise a TWT element to indicate BSS specific TWT parameter values (i.e., service period schedule and properties).

Figure 8:
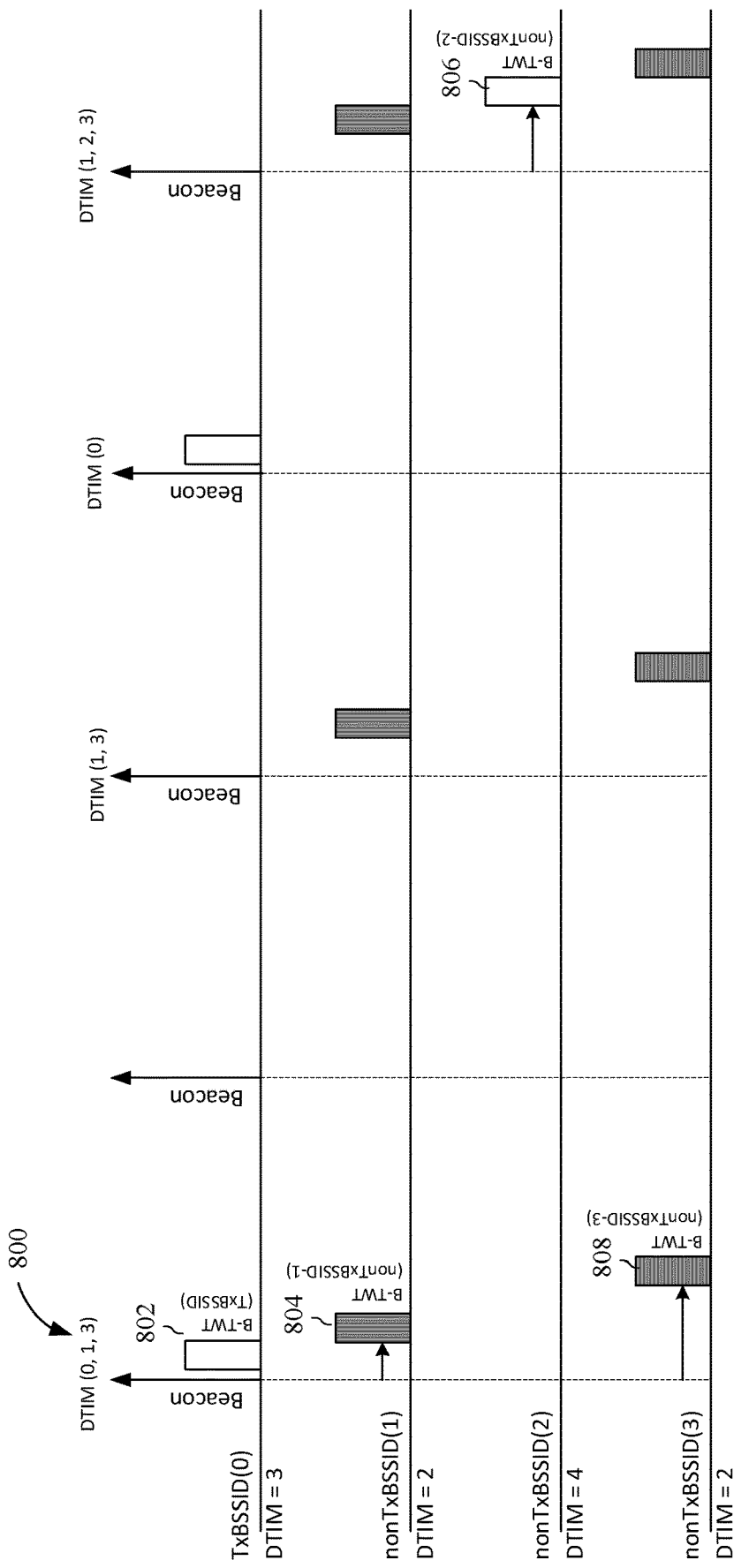
FIG. 8 illustrates an example multi-BSSID procedure, in accordance with certain aspects of the present disclosure.

FIG. 8 illustrates an example of such spreading of group addressed frames within a beacon interval. The example assumes four VAPs with DTIM intervals that overlap: TxBSSID0 VAP0, and non TxBSSIDs1-3 VAP1-3. As illustrated, TxBSSID has a DTIM of 3, nonTx BSSID1 and nonTx BSSID3 each have a DTIM of 2, while nonTx BSSID2 has a DTIM of 4. In general, the AP for TxBSSID0 may advertise (in a DTIM beacon) that every third beacon 800 it may send group addressed traffic. Thus, stations in each BSSID may wake up at different times spread throughout a DTIM if the corresponding beacon indicates group addressed traffic is to follow. As illustrated, STAs in TxBSSID0 may wake up at 802 within every 3rd DTIM, STAs in non-TxBSSID1 and non-TxBSSID3 may wake up at 804 and 808 (respectively) within every 2nd DTIM, while STAs in non-TxBSSID2 may wake at 806 of every fourth DTIM.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. More specifically, operations 600 illustrated in FIG. 6 correspond to means 600A illustrated in FIG. 6A and operations 700 illustrated in FIG. 7 correspond to means 700A illustrated in FIG. 7A.

For example, means for transmitting, means for outputting for transmission or means for communicating may include a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may include a receiver (e.g., the receiver unit 222) and/or an antenna(s) 224 of the access point 110 or the receiver unit 254 and/or antenna(s) 252 of the station 120 illustrated in FIG. 2. Means for selecting, means for generating, means for obtaining, means for determining or means for comparing a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall network or system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communications media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication comprising:
    an interface configured to obtain a frame from a wireless node, said frame comprising:
        a header comprising a first address of a plurality of addresses;
        a first portion comprising one or more indications of one or more second addresses of the plurality of addresses; and a second portion comprising first parameters for communication with the wireless node; and a processing system configured to:
determine whether the apparatus is associated with the first address or one of the one or more second addresses, wherein the determination comprises comparing an address of the apparatus with the first address and the one or more second addresses;
if the determination indicates the apparatus is associated with the first address, communicate with the wireless node based on the first parameters; and
if the determination indicates the apparatus is associated with one of the second addresses, determine whether to communicate with the wireless node using the first parameters or using second parameters associated with said one of the second addresses, wherein:
the first address is associated with a first basic service set (BSS) and the first parameters indicate first target wake time (TWT) parameters for the first BSS; and
said one of the second addresses is associated with a second basic service set (BSS) and the second parameters indicate second target wake time (TWT) parameters for the second BSS.

2. The apparatus of claim 1, wherein:
the first portion further comprises, for each of the one or more second addresses, second parameters for communication with the wireless node; and
if the determination indicates the apparatus is associated with one of the one or more second addresses, the processing system is configured to communicate with the wireless node based on the second parameters associated with said one of the one or more second addresses.

3. The apparatus of claim 1, wherein:
the one or more second addresses comprise two second addresses;
the first portion comprises second parameters for communication with the wireless node;
the second parameters are associated with a first one of the two second addresses;
if the determination indicates the apparatus is associated with the first one of the two second addresses, the processing system is further configured to communicate with the wireless node based on the second parameters; and
if the determination indicates the apparatus is not associated with the first one of the two second addresses, the processing system is further configured to communicate with the wireless node based on the first parameters.

4. The apparatus of claim 1, wherein each of the plurality of addresses identifies a different basic service set (BSS).

5. The apparatus of claim 1, wherein each of the plurality of addresses comprises a different BSS identifier (BSSID) or a different MAC address.

6. The apparatus of claim 1, wherein the processing system is configured to:
determine to communicate with the wireless node using the second parameters if the frame includes said second parameters; or
determine to communicate with the wireless node using the first parameters if the frame lacks said second parameters.

7. The apparatus of claim 1, wherein:
at least one of the first TWT parameters or the second TWT parameters are conveyed in a TWT element.

8. The apparatus of claim 1, wherein:
the frame further comprises an indication that the first or second TWT parameters are associated with the first or second addresses.

9. The apparatus of claim 1, wherein the processing system is further configured to, if the determination indicates the apparatus is associated with one of the second addresses:
determine whether to communicate with the wireless node using the first parameters, to communicate with the wireless node using second parameters associated with said one of the second addresses, or to not operate in a communication mode that requires the first or second parameters.

10. An apparatus for wireless communication comprising:
a processing system configured to:
select a first address from a plurality of addresses associated with the apparatus, said plurality of addresses comprising the first address and one or more second addresses, wherein at least one of the plurality of addresses corresponds to an address of another apparatus; and
generate a frame comprising:
a header comprising the first address;
a first portion comprising one or more indications of the one or more second addresses, wherein the first portion further comprises at least one target wake time (TWT) element, said at least one TWT element comprising second parameters for communication with the apparatus; and
a second portion comprising first parameters for communication with the apparatus, wherein the second portion comprises a target wake time (TWT) element comprising the first parameters; and
an interface configured to output the frame for transmission.

11. The apparatus of claim 10, wherein each of the plurality of addresses identifies at least one of: different basic service sets (BSSs), a different basic service set identifiers (BSSIDs), or different media access control (MAC) addresses.

12. The apparatus of claim 10, wherein the frame comprises a management frame.

13. The apparatus of claim 12, wherein the management frame comprises a beacon frame,
a probe response frame, an association frame or a reassociation frame.

14. The apparatus of claim 10, wherein the first portion comprises a Multiple BSS ID element.

15. The apparatus of claim 10, wherein the first parameters indicate at least one of a first schedule regarding when to transmit to the apparatus or a second schedule regarding when to receive from the apparatus or a third schedule regarding when to transmit to or receive from the apparatus.

16. The apparatus of claim 10, wherein the first portion further comprises, for each of the one or more second addresses, second parameters for communication with the apparatus.

17. The apparatus of claim 10, wherein:
the one or more second addresses comprise two second addresses;
the first portion comprises second parameters for communication with the apparatus; and the second parameters are associated with one of the two second addresses.

18. The apparatus of claim 17, wherein the second parameters indicate at least one of a first schedule regarding when to transmit to the apparatus or a second schedule regarding when to receive from the apparatus.

19. The apparatus of claim 10, wherein:
the one or more second addresses comprise one second address;
the frame generation comprises:
  determining a first schedule for communication with the apparatus associated with the first address;
  determining a second schedule for communication with the apparatus associated with the second address; and
  comparing the first schedule and the second schedule; and
if the comparison shows the first and second schedules are the same, the first parameters indicate the first or second schedule.

20. The apparatus of claim 10, wherein:
the one or more second addresses comprise one second address;
the frame generation comprises:
  determining a first schedule for communication with the apparatus associated with the first address;
  determining a second schedule for communication with the apparatus associated with the second address; and
  comparing the first schedule and the second schedule;
if the comparison shows the first and second schedules are not the same:
  the first parameters indicate the first schedule; and
  the first portion further comprises second parameters indicating the second schedule.

21. The apparatus of claim 20, wherein the frame further comprises a first indication that the first schedule is associated with the first address and a second indication that the second schedule is associated with the second address.

22. A method for wireless communication by an apparatus comprising:
obtaining a frame from a wireless node, said frame comprising:
  a header comprising a first address of a plurality of addresses;
  a first portion comprising one or more indications of one or more second addresses of the plurality of addresses; and
  a second portion comprising first parameters for communication with the wireless node;
determining whether the apparatus is associated with the first address or one of the one or more second addresses, wherein the determination comprises comparing an address of the apparatus with the first address and the one or more second addresses;
if the determination indicates the apparatus is associated with the first address, communicating with the wireless node based on the first parameters; and
if the determination indicates the apparatus is associated with one of the second addresses, determining whether to communicate with the wireless node using the first parameters or using second parameters associated with said one of the second addresses, wherein:
  the first address is associated with a first basic service set (BSS) and the first parameters indicate first target wake time (TWT) parameters for the first BSS; and
  said one of the second addresses is associated with a second basic service set (BSS) and the second parameters indicate second target wake time (TWT) parameters for the second BSS.

23. A method for wireless communication by an apparatus comprising:
selecting a first address from a plurality of addresses associated with the apparatus, said plurality of addresses comprising the first address and one or more second addresses, wherein at least one of the plurality of addresses corresponds to an address of another apparatus;
generating a frame comprising:
  a header comprising the first address;
  a first portion comprising one or more indications of the one or more second addresses, wherein the first portion further comprises at least one target wake time (TWT) element, said at least one TWT element comprising second parameters for communication with the apparatus; and
  a second portion comprising first parameters for communication with the apparatus, wherein the second portion comprises a target wake time (TWT) element comprising the first parameters; and
outputting the frame for transmission.

* * * * *